United States Patent Office 2,773,046
Patented Dec. 4, 1956

2,773,046

VINYL RESIN PLASTICIZED WITH A POLYHALO-PHENYL PHOSPHATE

James H. Dunn and Paul E. Weimer, Baton Rouge, La., assignors to Ethyl Corporation, New York, N. Y., a corporation of Delaware No Drawing. Application December 3, 1953,
Serial No. 396,058

6 Claims. (Cl. 260—30.6)

This invention relates to a new composition of matter and more particularly to a novel plastic alloy.

Many polymers and co-polymers presently manufactured are difficult to process and require the addition of a plasticizing agent or similar material prior to fabrication. However, while the plasticizer improves the workability of the polymer, in many cases the material is unduly flexible and of low impact strength, making the product unsuitable for many uses. Typical examples of polymers in which plasticizers are employed are vinyl chloride and styrene.

It is accordingly an object of this invention to provide an improved polymer composition. Another object is to provide a polymer which can be easily fabricated and yet has improved rigidity and strength characteristics. Another object is to provide a composition of the above type which can be manufactured economically and formed from cheaper raw materials. Other objects and advantages of this invention will become apparent from the following description and appended claims.

It has now been found that if polymers and co-polymers are alloyed with certain polyhalophenyl phosphates that the polymers can be more readily worked or fabricated and at the same time the final product has considerably improved rigidity over the previously plasticized polymers. The product of this invention is very similar to polymers known commercially as "rigids," such as rigid polyvinyl chloride and similar polymers. In addition, the alloy composition of this invention has materially improved thermal properties, particularly with respect to its flame resistance and its heat distortion point.

The alloying agents suitable for this invention are compounds having the general formula:

wherein R₁ and R₂ are halophenoxy radicals having between 3 and 5 nuclear substituted halogen atoms and R₃ is a radical selected from the group consisting of OH and a halophenoxy radical having between 3 and 5 nuclear substituted halogen atoms. It is preferred that the phosphorous be tris-substituted with halophenoxy radicals, or at least that there be a minimum of seven chlorine atoms on the phenyl groups. That is, if only two phenoxy groups are substituted in the phosphate molecule, that the two phenyl groups have a total halogen content of seven halogen atoms. However, it is preferred that the phenoxy groups on the phosphate molecule have a total of at least 8 halogen atoms.

Typical examples of alloying agents of this invention are tris - (trichlorophenyl)phosphate, tris - (tribromophenyl)phosphate, tris - (tetrachlorophenyl)phosphate, tris - (tetrabromophenyl)phosphate, tris - (pentabromophenyl)phosphate, bis - (trichlorophenyl)mono(tetrachlorophenyl)phosphate, mono(trichlorophenyl)bis-(tetrachlorophenyl)phosphate, bis - (trichlorophenyl)mono-(pentachlorophenyl)phosphate, mono(tetrachlorophenyl)bis - (pentachlorophenyl)phosphate, bis - (tribromophenyl)mono(tetrabromophenyl)phosphate, mono(tribromophenyl)bis - (pentabromophenyl)phosphate, bis-(tetrachlorophenyl)phosphate, bis - (pentachlorophenyl)-phosphate, mono(tetrachlorophenyl)mono(pentachlorophenyl)phosphate, bis - (tetrachlorophenyl) monotolyl phosphate, bis - (tetrachlorophenyl) monobenzyl phosphate, bis - (tetrachlorophenyl) monomethyl phosphate, bis - (tetrachlorophenyl) monoethyl phosphate, bis - (pentachlorophenyl) methyl phosphate, tetrachlorophenyl pentachlorophenyl phenyl phosphate, bis - (tetrabromophenyl)phosphate, mono(tetrachlorophenyl) mono(tetrabromophenyl)phosphate, bis - (pentachlorophenyl)phosphorous chloride, and bis - (tetrabromophenyl)phenyl phosphate.

The polymers which can be alloyed in accordance with the present invention are any formed from a polymerizable monomer having the general formula:

$$>C=C<$$

wherein the ethylenic group is substituted by a member of the group consisting of hydrogen, alkyl, cycloalkyl, aryl, alkaryl, alkoxyalkyl, halogen, alkenyl, carboalkoxy, acetyle, cyano, esters, carboxy, amido, aldehydo, alkenyloxy, alkynyl, thienyl, furanyl, tetrahydrofuranyl, pyranyl, and higher heterocyclic groups.

Typical examples of the above radicals are methyl, ethyl, propyl, butyl, cyclopentyl, cyclohexyl, phenyl, halogenophenyl, nitrophenyl, tolyl, xylyl, ethylphenyl, benzyl, phenylethyl, methylbenzyl, methoxy, ethoxy, methoxymethyl, ethoxymethyl, fluoro, chloro, bromo, iodo, vinyl, chlorovinyl, carbomethoxy, carboethoxy, acetyl, propionyl, cyano, formoxy, acetoxy, propionoxy, carboxy, amido, vinyloxy, allyloxy, ethynyl, furanyl, pyridyl, carbazyl, indolyl, indenyl, pyrrolyl, and pyrrolidinyl.

Other monomers of which corresponding polymers are also suitable for alloying with the above agents of this invention are unsaturated cyclic compounds, such as indene, dioxene, dithiene, dioxadiene, coumarone, etc.

Specific examples of suitable polymerized monomers which can be alloyed are ethylene, propylene, isobutylene; dienes, such as butadiene, isoprene, 2,3-dimethylbutadiene, dimethyl pentadiene, cyclopentadiene, etc.; halogenated olefins and multiolefins, such as the vinyl halides, i. e., vinyl chloride, vinyl fluoride, vinyl bromide and vinyl iodide, the vinylidene halides, i. e., vinylidene chloride, vinylidene fluoride, vinylidene bromide, and vinylidene iodide, 1,2-chloroethylene, 1,2-dibromethylene, halogenated ethylenes, tetrahalogenated ethylenes, 2-halogenobutadienes; esters of unsaturated alcohols with mono- and polybasic saturated and unsaturated acids, such as vinyl acetate, allyl acetate, diallyl maleate, etc.; esters of saturated alcohols with mono- and polybasic unsaturated acids, such as methyl acrylate, ethyl acrylate, methyl methacrylate, ethyl methacrylate, haloacrylates, diethyl maleate, diethyl furmarate, etc.; unsaturated ethers, such as divinyl ether, diallyl ether, vinyl alkyl ethers, allyl alkyl ethers; unsaturated nitriles, such as acrylonitrile, methacrylonitrile, haloacrylonitriles, phenyl acrylonitriles, vinylidene cyanide, etc.; unsaturated amides, such as acrylamide, methacrylamide, N-substituted unsaturated amides, e. g., N,N-dimethyl acrylamide, N,N-diethylacrylamide, N-methylacrylamide, etc.; unsaturated acids and anhydrides, such as acrylic acid, methacrylic acid, crotonic acid, itaconic acid, maleic anhydride, etc.; unsaturated ketones, such as divinyl ketone, vinyl alkyl ketones, etc.; unsaturated aldehydes and acetals, such as acrolein and its acetals, methacrolein and its acetals, etc.; unsaturated aromatic compounds such as divinyl benzene, styrene, mono- and polyhalo styrenes, alkyl styrenes, cyano styrenes, allylbenzene, vinyl naphthalene, etc.; unsaturated heterocyclic compounds, such as vinyl pyridine,

vinyl furan, vinyl coumarone, vinyl dibenzofuran, N-vinyl carbazole, etc.; unsaturated alicyclic compounds, such as vinylcyclopentane, vinyl cyclohexane, etc.; unsaturated alcohols, such as 2-methylallyl alcohol, allyl alcohol, etc.; and unsaturated sulfides, sulfoxides, sulfones, sulfites, sulfates, sulfonates, phosphines, phosphites, phosphates, phosphonates and silanes.

The alloying agent can be combined with the above polymers in a wide range of concentrations. It is generally employed in a concentration of between 5–65 percent, based upon the total weight of the polymer and alloying agent. A more preferred concentration of alloying agent is between 10–40 percent by weight, based upon the weight of the mixture.

Other materials can be added to the alloy mixture, including conventional plasticizers, stabilizing agents, lubricants, fillers, pigments and the like. Typical examples of plasticizers are: dioctyl phthalate, dihexyl phthalate, dioctyl adipate, dihexyl adipate, amyl phthlate, butyl phthalyl, butyl glycollate, butyl sebacate, butyl succinate, butyl tartrate, ethoxyethyl adipate, ethoxyethyl phthalate, ethyl benzoyl benzoate, ethyl phthalyl ethyl glycollate, ethylene glycol dibutyrate, ethylene glycol dipropionate, tributyl citrate, triethylene glycol diacetate, triethylene glycol dibutyrate, triethylene glycol dipropionate, ethylene glycol mono stearate, ethylene glycol distearate, diethylene glycol mono laurate, diamyl oxalate, dimethylcyclohexyl oxalate, dibutyl tartrate, dilauryl sebacate, and ethyl abietate. The latter plasticizers are particularly suitable to improve the low temperature properties of the plastic and, when combined with the alloying agents of this invention, provide plasticized compositions having extremely good thermal properties along with low volatility.

The alloys of this invention can be formulated by any of the known mixing procedures which include a Banbury mixer, an extruder or a roll mill. The alloyed material can also be finished by any of the conventional means such as molding, casting, calendering or pressing into sheets, extruding, etc.

The following are examples which illustrate the present invention but are not to be construed as limiting same. In each of these examples the quantities are given in parts by weight.

*Example I*

Polystyrene (100 parts) was mixed on a roll mill with 20 parts of tris-(trichlorophenyl)phosphate. The mixture was milled for 10 minutes at 320° F. The rough sheet so-obtained was thereafter pressed between two plates at approximately 625 pounds p. s. i. gage and at a temperature of 340° F. for approximately 5 minutes. The finished product was a clear, rigid sheet having excellent flame resistance characteristics and a high heat distortion point. The product had a very high impact strength when tested by the Izod impact strength method.

*Example II*

Example I is repeated except that 20 parts of tris-(tetrachlorophenyl)phosphate is employed as an alloying agent with the polystyrene. The product is similar to that obtained in Example I.

*Example III*

Example I is repeated except that bis-(trichlorophenyl)-phosphate is employed as the alloying agent. The product is similar to that of Example I.

*Example IV*

This example can be compared with Examples I–III, inclusive. In this example tris-(monochlorophenyl)phosphate is employed as the alloying agent. The procedure is the same as followed in Example I but the product had poor flame resistance characteristics and a low heat distortion point. In addition, the product obtained is considerably less rigid than the products obtained in Examples I–III, inclusive, above.

*Example V*

Polyvinyl chloride (100 parts) was mixed with 50 parts of tris-(trichlorophenyl)phosphate on a roll mill at a temperature of 310° F. for a period of 12 minutes. Four (4) parts of a stabilizer, dibutyl tin dilaurate, was added prior to the milling operation to prevent decomposition and discoloration. One (1) part of a lubricant, stearic acid, was also added to the mixture. The rough sheet so-obtained from the roll mill was pressed between two plates at approximately 280 pounds p. s. i. and at a temperature of 300° F. for 3 minutes. The pressed product was a clear, rigid sheet having excellent flame resistance characteristics and a relatively high heat distortion point of 125° F. and an Izod impact strength of 0.47 foot pounds per square inch.

*Example VI*

Example V was repeated except that 50 parts of dioctyl phthalate was substituted for the tris-(trichlorophenyl)-phosphate. In this case, a very flexible product was obtained having a low impact strength and poor flame resistance characteristics. The heat distortion point is relatively low.

*Example VII*

Example V was repeated except that 45 parts of tris-(trichlorophenyl)phosphate, 3 parts of dioctyl phthalate, 2 parts of stabilizer and one (1) part of lubricant were added to the 100 parts of polyvinyl chloride. The product was considerably more rigid than the product of Example VI and less flammable.

*Example VIII*

Example VII was repeated except that 47 parts of bis-(pentachlorophenyl)phosphate was added to the polyvinyl chloride. The product obtained was opaque, quite rigid and could be readily processed.

*Example IX*

Example V was repeated except that 40 parts of bis-(pentachlorophenyl)phosphate and 2 parts of stabilizer were employed with the polyvinyl chloride and lubricant. The relatively rigid product obtained had an impact strength of 0.70 foot pounds per square inch and a heat distortion point of 190° F.

*Example X*

Example V was repeated except that 52 parts of the tris-(trichlorophenyl)phosphate were employed. The product was quite rigid and had excellent thermal properties.

The following is a table of other suitable alloyed compositions in accordance with the present invention.

TABLE

| Polymer | | Alloying Agent | |
|---|---|---|---|
| Name | Parts | Name | Parts |
| Vinyl chloride | 95 | Tris-(trichlorophenyl) phosphate. | 5 |
| Do | 75 | ___do___ | 25 |
| Do | 40 | ___do___ | 60 |
| Do | 75 | Bis-(pentachlorophenyl) phosphate. | 25 |
| Styrene | 40 | Tris-(tetrachlorophenyl) phosphate. | 60 |
| Do | 60 | ___do___ | 40 |
| Methyl methacrylate | 85 | ___do___ | 15 |
| Vinylidene chloride | 75 | ___do___ | 25 |
| Vinyl acetate | 70 | ___do___ | 30 |

The polyhalophenyl phosphates useful in this invention can be prepared by any known means. One method for preparing these compounds is by reacting a phosphorus oxyhalide or phosphoric acid with a halogenated phenolic compound. Rather than using the pure halogen compound, mixtures of such compounds can be employed either successively or simultaneously for reaction with the phosphoric acid or the phosphorus oxyhalide compound to prepare mixed tri- or bi(halogen aryl)phosphates.

An example of making the 2,4,5-trichlorophenyl is as follows: 197.5 parts (1 mole) of 2,4,5-trichlorophenyl and 79 parts (1 mole) pyridine were dissolved in 400 parts of benzene. To this solution was added 46 parts (0.3 mole) of phosphorus oxychloride. The solution was stirred at a temperature of 83° C. for 3 hours. Thereafter, the solution was cooled and the pyridine hydrogen chloride was dissolved in excess water. A white solid precipitate tris-(trichlorophenyl)phosphate was formed and was washed with water and benzene. The product had a melting point of about 160° C. and a chlorine content of 47.7 percent. The molecular weight by saponification number was 573, by cryoscopic methods it was 590. 108 parts of product were recovered.

The improved plastic alloy composition of this invention can be used in the production of a wide variety of articles and manufactured products. For example, the material is suitable for manufacture into tubing, pipes and other structural forms. It can be used for sheeting, coatings, moldings and is particularly useful for uses to which rigid polymers are presently employed. The final product, in addition to having the desired rigidity and strength characteristics of articles previously made from rigid polyvinyl chloride and the like, has excellent flame resistance and a high heat distortion point.

We claim:

1. A plastic alloy comprising an ethylenic polymer selected from the group consisting of polyvinyl chloride, polystyrene, polymethyl methacrylate, polyvinylidene chloride and polyvinyl acetate and a compound having the general formula:

wherein $R_1$ and $R_2$ are halophenoxy radicals having between 3 and 5 nuclear substituted halogen atoms and $R_3$ is a radical selected from the group consisting of OH and a halophenoxy radical having between 3 and 5 nuclear substituted halogen atoms, said halophenoxy radicals having the combined total of at least eight halogen atoms, said halogen atoms being selected from the group consisting of chlorine and bromine.

2. The plastic alloy of claim 1 in which the halophenoxy compound is tris-(trichlorophenyl) phosphate.

3. The plastic alloy of claim 2 wherein the ethylenic polymer is polyvinyl chloride.

4. The plastic alloy of claim 1 in which the halophenoxy compound is bis-(pentachlorophenyl) phosphate.

5. The plastic alloy of claim 4 in which the ethylenic polymer is polyvinyl chloride.

6. The plastic alloy of claim 1 wherein the ethylenic polymer is polyvinyl chloride.

References Cited in the file of this patent
UNITED STATES PATENTS

| | | |
|---|---|---|
| 2,325,982 | Sarbach | Aug. 3, 1943 |
| 2,561,493 | Caprio et al. | July 24, 1951 |
| 2,613,156 | McGaffin et al. | Oct. 7, 1952 |